United States Patent

[11] 3,561,655

[72] Inventors Yukio Yasukawa
 Kogandori;
 Yasuyuki Nakahara, Suwa-shi, Japan
[21] Appl. No. 824,826
[22] Filed May 15, 1969
[45] Patented Feb. 9, 1971
[73] Assignee Sankyo Kogaku Kabushiki-Kaisha
 Suwa-shi, Japan
[32] Priority May 18, 1968, June 18, 1968
[33] Japan
[31] 43/33255 and 43/41778

[54] MOVIE FILM FEED CONTROL DEVICE
 10 Claims, 18 Drawing Figs.
[52] U.S. Cl. .................................................... 226/35,
 226/44, 226/113
[51] Int. Cl. .................................................... B65h 23/16
[50] Field of Search .......................................... 226/34, 35,
 44, 113, 183, 10, 24, 45, 200, 177

[56] References Cited
UNITED STATES PATENTS
2,345,656  4/1944  Calleson et al. .............. 226/44X
3,225,989  12/1965  Stine ............................ 226/44

Primary Examiner—Allen N. Knowles
Assistant Examiner—Edwin D. Grant
Attorney—McGlew and Toren ABSTRACT: A movie film feed control device comprising a friction wheel positioned between a light transmitting window for projection or picture taking and a film supply reel, means for yieldably pressing against the inner side of a loop of film formed between said friction wheel and said light transmitting window, and a contact member positioned between said yieldable pressing means and said friction wheel and adapted to be contacted by the film. The device permits to correct the shape of the loop of film and feed the film accurately at all times by varying the force with which the film presses against the friction wheel by the interaction of said yieldable pressing means and said contact member.

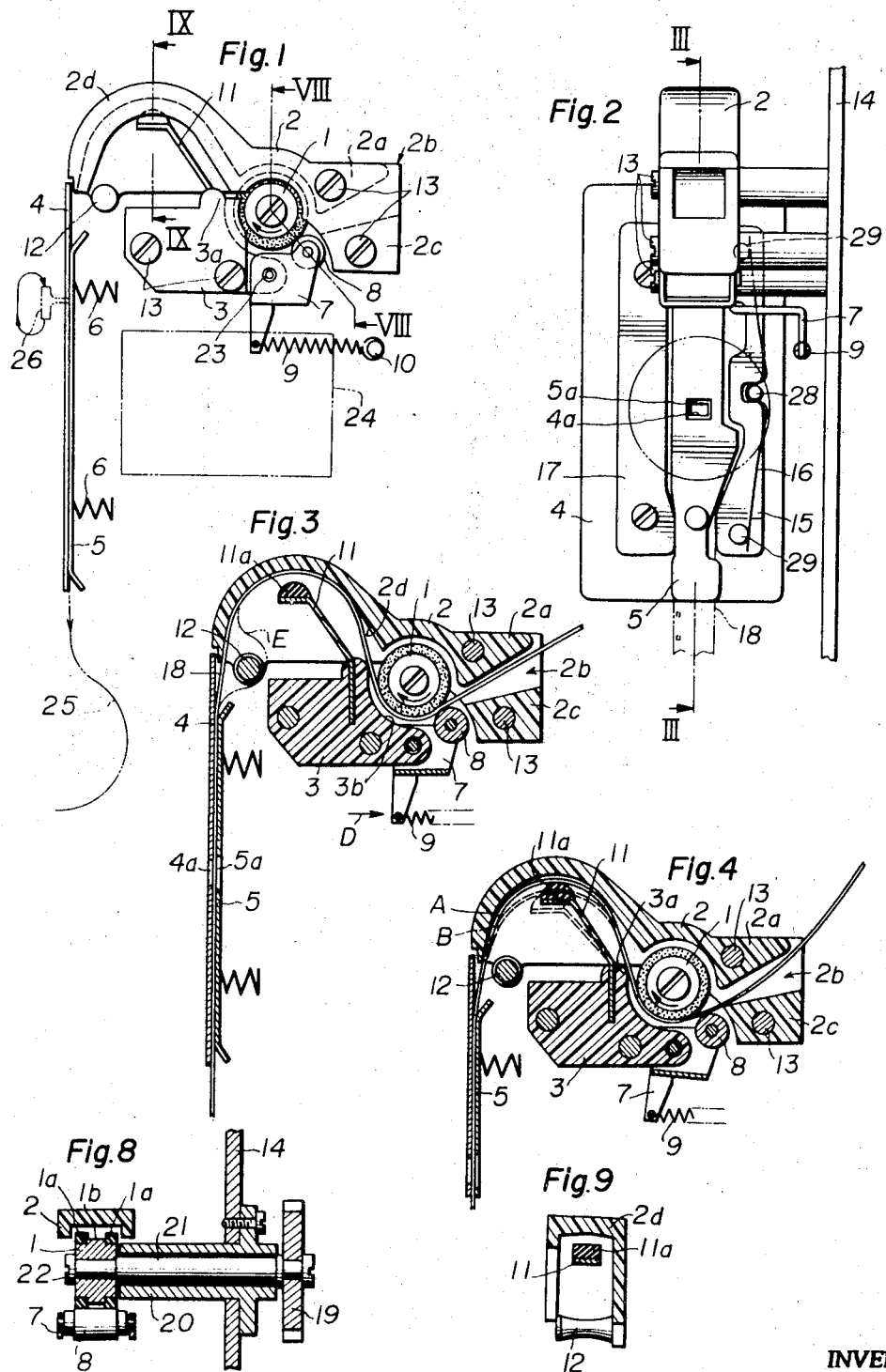

INVENTORS
YUKIO YASUKAWA
YASUYUKI NAKAHARA

BY McKew and Toren
ATTORNEYS

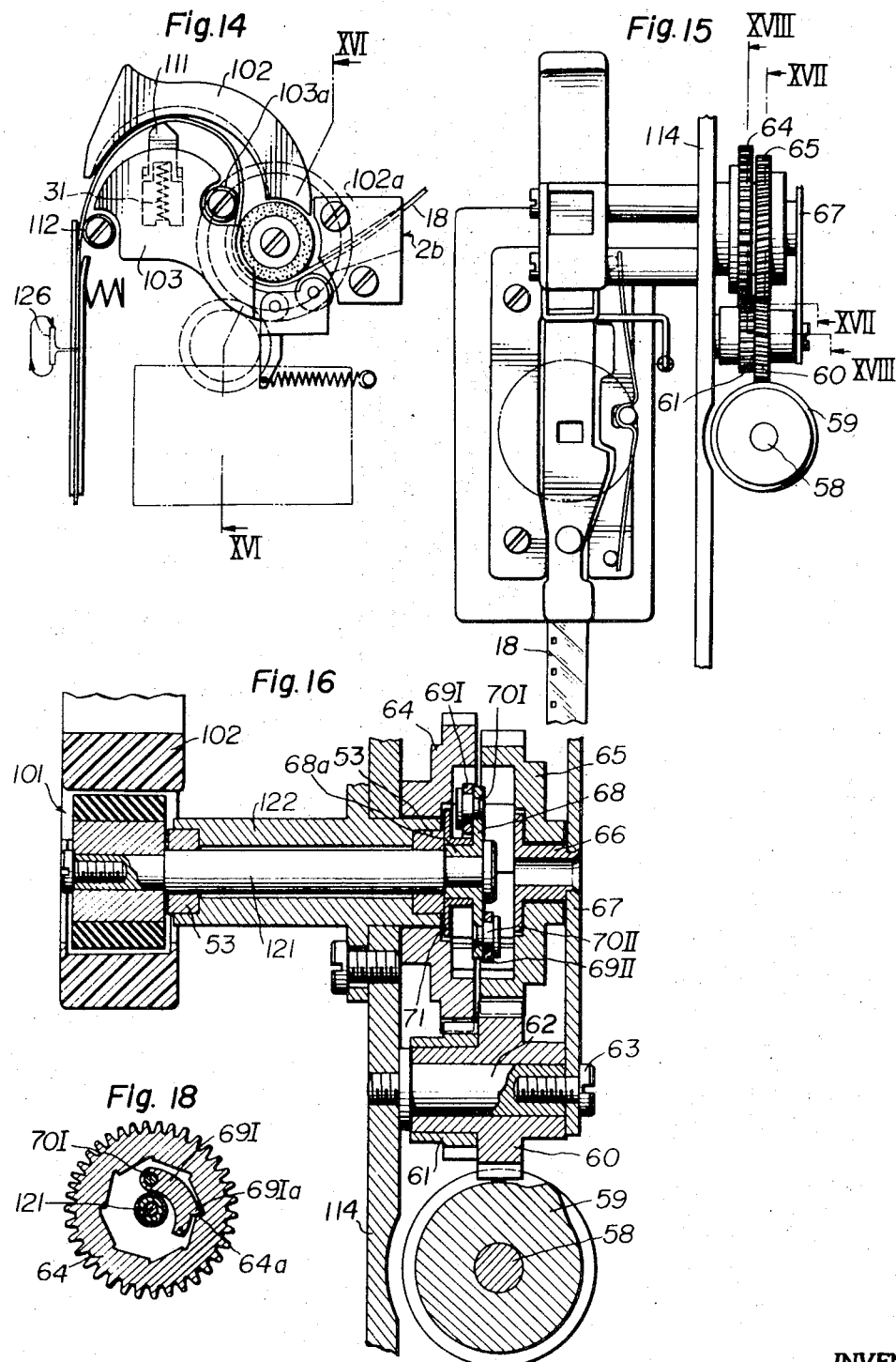

MOVIE FILM FEED CONTROL DEVICE

The present invention relates to film feed control devices for movie projectors or movie cameras. In particular, the invention deals with a film feed control device which uses a friction wheel for controlling film feed in place of a sprocket wheel adapted to engage the perforations formed on the edge of the film.

The film feed control device is an important part of movie projectors because any movie projector must be able to provide pictures which are stable and free from shake on the screen.

Generally, movie projectors which are popular at present operate such that film is intermittently advanced and the images on the film are transmitted by the rays of light from a light source through a lens onto the screen to provide enlarged pictures thereon during the very short time interval in which the film remains motionless. The image on the film is generally enlarged at a high magnification on the screen. This creates the problem, which is difficult to obviate, of how to stabilize the pictures projected onto the screen. That is, when the film is advanced intermittently, it is necessary to advance the film such that the frames of the film are maintained in predetermined relative positions. If any one of the frames on the film representing a continuous picture were displaced from a predetermined position with respect to the adjacent frames when the film is advanced and screened, the pictures projected onto the screen would show oscillation or the so-called picture shake, so that the pictures cannot satisfy the viewers. This degrades the quality of the projectors.

In movie projectors which use a film advance pawl for advancing film, the film is advanced instantaneously when the film advance pawl moving up and down in reciprocating motion is received in a perforation of the film and advances the film a distance corresponding to the pitch of perforations. The film is pressed from the front and the side of or from either the front or the side by a film gate plate formed with a light transmitting window and a pressure plate and maintained in a correct position, in order that the pictures of the film may be disposed in a correct position with respect to the projection optical system and the aforementioned picture shake on the screen may be eliminated. However, the film feed system in which the feed pawl is used for feeding the film from a film supply reel has a disadvantage in that the rate of rotation of the film supply reel cannot keep pace with the rate of intermittent and instantaneous film advance, with a result that the film is stretched more than is necessary and makes good intermittent film advance impossible. In order to obviate this disadvantage, nearly all the movie projectors developed in recent years mount a sprocket wheel which is positioned between the film supply reel and the feed pawl or the film gate for rotation in association with shutter blades so as to forcibly unwind film from the reel and form a loop of film between the sprocket wheel and the film gate and loosen the film, thereby lessening a film advance resistance to which the feed pawl is subjected.

In recent years, however, varieties of films with different perforation pitches have been marketed, so that it has become necessary to provide a movie projector which can adapt itself to different varieties of films. If a movie projector employing a sprocket wheel were to adapt itself to different types of films, it would be necessary either to have on hand interchangeable sprocket wheels which fit different perforation pitches or to use a variable-pitch sprocket wheel. This entails inevitable complication of construction with a multiplicity of component parts and increased cost of production.

In order to obviate this problem, an attempt has been made to replace the sprocket wheel with a nonrotating guide pin and to mount a resilient plate spring having a pivotal free end and called a stabilizer between said guide pin and the film gate, said free end of said resilient plate spring pressing against the inner side of the film so that a loop of film may be formed between the film gate and the guide pin. However, the movie projector constructed as aforementioned makes it more difficult to smoothly unwind film from the film supply reel than the movie projector provided with a sprocket wheel, so that the loop of film formed cannot be maintained in a satisfactory condition. This prevents the provision of stable pictures on the screen and the projection of film has often been interrupted.

Accordingly, an object of the present invention is to provide a movie film feed control device which permits imparting a smooth intermittent movement to the film passing through a film gate without using a sprocket wheel adapted to engage the perforations of the film.

Another object of the invention is to provide a movie film feed control device which comprises a film feed friction wheel having a controlled rate of rotation which is useful for advancing film passing through the film gate in intermittent movement.

Still another object of the invention is to provide a movie film feed control device which is provided with a clutch mechanism adapted to dissociate the film feed friction wheel from a drive wheel for rotating the friction wheel when the direction of feed of the film is reversed.

A further object of the invention is to provide a movie film feed control device which permits the maintaining in an optimum form, of a loop of film formed above the film gate, irrespective of whether the film is fed in a normal direction or in a reverse direction, whereby the film can be fed smoothly in intermittent movement.

Additional objects as well as features and advantages of the invention will become apparent from the description set forth hereinafter when considered in conjunction with the accompanying drawings, in which:

FIG. 1 is a side view of essential portions of one embodiment of the movie film feed control device according to this invention, with other portions of the movie projector to which the device of this invention is applied being omitted;

FIG. 2 is a front view of FIG. 1;

Figure 5:
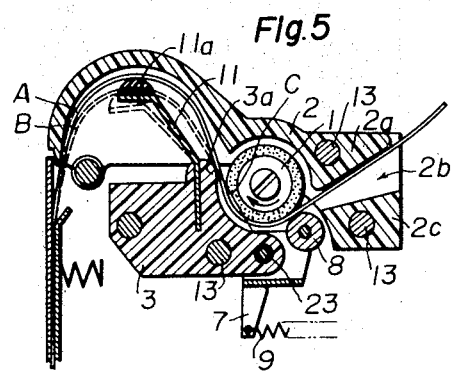
Figure 6:
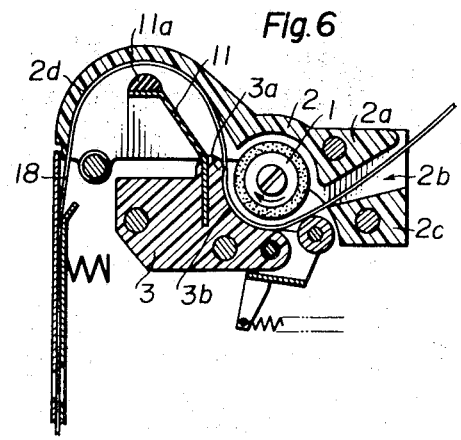
Figure 7:
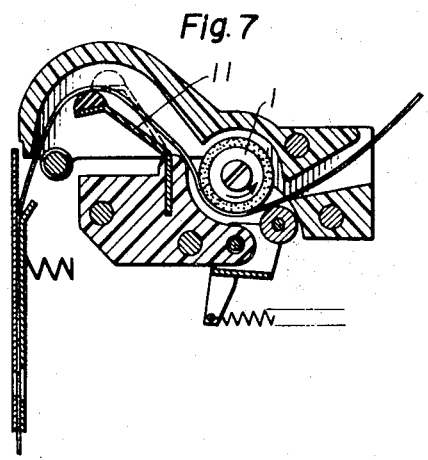
Figure 10:
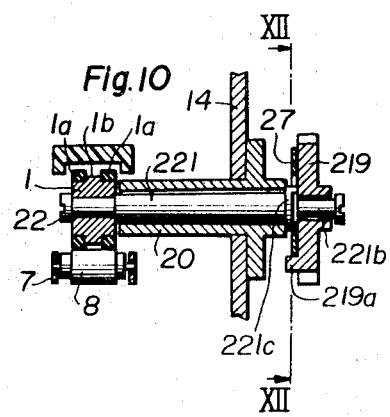
Figure 12:
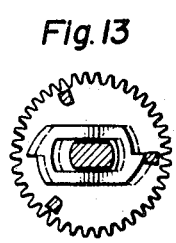
Figure 11:
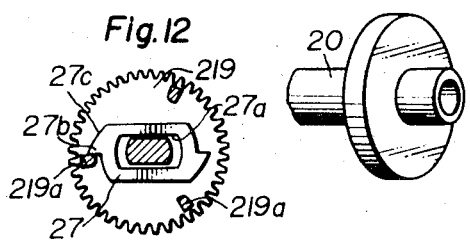
Figures 13, 17:
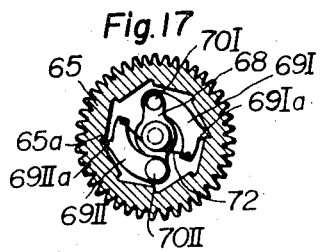

FIGS. 3 to 7 are sectional views taken along the line III-III of FIG. 2, FIG. 3 showing a film automatically fed to the film passage, FIG. 4 showing a change in a film loop formed between the film gate and the film feed friction wheel, FIG. 5 showing the film being subjected to increased resistance after it is unwound from the film supply reel, FIG. 6 showing the film being brought out of contact with the friction wheel as the loop of film has grown larger than is necessary, and FIG. 7 showing a change in the loop of film as the direction of feed of the film is reversed;

FIG. 9 is a sectional view along the line IX-IX of FIG. 1;

FIG. 10 is a sectional view of the movie film feed control device representing an improvement in the device of FIG. 8 in which a clutch mechanism is interposed between the shaft of the film feed friction wheel and the drive shaft for rotating the friction wheel;

FIG. 11 is an exploded perspective view of the clutch mechanism;

FIGS. 12 and 13 are sectional views along the line XII-XII of FIG. 10 showing the manner of operation of the clutch mechanism;

FIG. 14 is a side view of essential portions of another embodiment of the movie film feed control device according to this invention;

FIG. 15 is a front view of FIG. 14 as seen from the right;

FIG. 16 is an enlarged sectional view along the line XVI-XVI of FIG. 14;

FIG. 17 is a sectional view along the line XVII-XVII of FIG. 15; and

FIG. 18 is a sectional view along the line XVIII-XVIII of FIG. 15.

The embodiments of the invention shown in the drawings will now be explained. As is well known, a movie projector is provided with a film gate plate 4, pressure plate 5, guide member 17 attached to said gate plate 4 for engaging one lateral edge of the film, and lateral pressure plate 15 lightly pressing against the other lateral edge of the film for maintaining, in a correct position with respect to the projection optical system, the film that is moved in intermittent movement behind a projection lens cylinder 24 which is illustrated in a simplified form. The film gate plate 4 is formed with an aperture 4a which is slightly smaller than the image formed on the film, while the pressure plate 5 is formed with an aperture 5a which is slightly larger than the image formed on the film. The pressure plate 5 is urged by a resilient spring 6 to press against the film gate plate 4, while the lateral pressure plate 15 is urged by a spring 16 to move toward the guide member 17. The spring 16 which has a center portion engaging a pin 28 fixed to the film gate plate 4 presses at its opposite ends against pins 29, 29 respectively which are fixed to opposite ends of the lateral pressure plate 15.

Mounted above the lens cylinder 24 is a film feed friction wheel 1 which is firmly fixed by a screw 22 to the outer end of a shaft 21 (See FIG. 8). The shaft 21 which is rotatably mounted in a bearing cylinder 20 firmly fixed to a sidewall 14 has mounted on the opposite end a drive wheel 19 which is in meshing engagement with a gear of a drive mechanism. The outer circumferential surface of the friction wheel 1 is formed such that its center portion 1b is slightly depressed and opposite end portions 1a are slightly elevated (See FIG. 8) in order to minimize damage that the friction wheel might cause to the film by engagement and also to cause the film to move in a straight line. The opposite end portions 1a consist of cylindrical metal members having a coat of rubber or other friction material thereon or a rubber roller having a minor diameter portion in the center. Upper film guide means 2 and lower film guide means 3 which are firmly fixed to the side plate 14 by screws 13 are disposed above and below the friction wheel 1 respectively. Said upper film guide means 2 comprises an upper lateral portion 2a formed with a film insertion opening 26 for inserting the film unwound from the film supply reel, lower lateral portion 2c, and guide wall 2d substantially arcuate in form and extending toward the film gate plate 4 to form a loop of film therein. The upper lateral portion 2a and lower lateral portion 2c may be formed as separate entities. Said lower film guide means 3 rotatably carries a supporting plate 7 which rotatably supports an auxiliary roller 8. The supporting plate 7 is urged in the anticlockwise direction by a compression spring 9 so as to thereby cause the auxiliary roller 8 to lightly press against the friction wheel 1. The other end of the spring 9 is mounted on a pin 10 which is firmly fixed to the sidewall 14. A plate spring 11 positioned in a space defined by the arcuate guide wall 2d is firmly fixed at its base to the lower film guide means 3. A contact member 11a of a material that does not damage the film is fixed to the free end of the plate spring 11. An arcuate guide face 3a directed outwardly in section and arcuate guide face 3b directed inwardly in section are formed on the surface of the lower film guide means 3 which is in face to face relation with the friction wheel 1. The space defined by the guide wall 2d for forming a loop of film therein and film insertion opening 2b maintain communication with each other through a passage formed by the friction wheel 1 and the guide face 3b. Therefore, if the film supply reel is rotated in a normal direction and the film unwound therefrom is inserted into the film insertion opening 2b of the upper film guide means 2 while pressing the supporting plate 7 by a fingertip in the direction of arrow D in FIG. 3 so as to cause the auxiliary roller 8 to press strongly against the friction wheel 1, then the film is inserted between the friction wheel 1 and auxiliary roller 8 and introduced into the film passage formed by the friction wheel 1 and the guide faces 3b and 3a of the lower film guide means as the friction wheel 1 is rotated in the clockwise direction. Thereafter, the film moves along the inner wall of the film loop forming guide portion 2d of the upper film guide means 2 into the film feed passage formed by the film gate plate 4 and pressure plate 5. When the film reaches a position where a first perforation of the film indexes with a film feed pawl 26, the film feed pawl 26 which is moved in reciprocating motion is engaged in the perforation whereby the film is moved intermittently. When the film feed pawl is disengaged from the first perforation and the film remains stationary, the rays of light from the light source pass through the film to project the image on the film onto the screen. The frames of the film that have been projected are wound on a takeup reel.

The pressure applied to the supporting plate 7 may be released when the first perforation of the film receives the film feed pawl therein. A pin 12 serving as a guide pin is provided for the purpose of preventing the buckling of the film that may occur as shown by E in FIG. 3 and make the introduction of the film into the film gate impossible as the leading end of the film is repulsed by the pressure of contact between the film gate plate 4 and the pressure plate 5. The friction wheel 1 is rotated such that its peripheral speed is higher than the average feed rate of the film intermittently advanced by the feed pawl 26.

The operation of the film feed mechanism will be explained in further detail. The film advanced by the friction wheel 1 and auxiliary roller 8 impinges on the guide face 3b of the lower film guide means 3 and suddenly changes its direction of movement to turn upwardly and move along the arcuate surface into the loop forming wall 2d of the upper film guide means as shown in FIG. 3. As the film is caused to suddenly change its direction of movement as aforementioned, the film which is resilient presses against the outer circumferential surface of the friction wheel 1 with a sufficiently strong force, so that the film can be advanced positively by the frictional dragging of the friction wheel 1.

As the feed pawl 26 begins to advance the film intermittently, the film is released from engagement with the loop forming wall 2d as shown in FIG. 4, so that the film is brought into contact with the contact member 11a of the plate spring 11. At the same time, the film is brought into increasingly intimate contact with the friction wheel 1. No drive force is generally exerted on the film supply reel of movie projectors when the reel is rotated in the normal direction, so that the film unwound from the reel is subjected to a force of resistance which varies depending on the force with which the film is unwound or a force working in a direction opposite to the direction in which the friction wheel draws the film. If this force is small, then the film can be advanced in the manner shown in FIG. 4. However, if the force of resistance exceeds a certain level, the length of film between the supply reel and friction wheel is tensioned as shown in FIG. 5, resulting in a reduction in the amount of film advanced. This causes a reduction in the size of film loop formed which is brought to a state shown by a broken line B and moves the contact member 11a downwardly. At this time, a tensile force is formed in the film itself by the biasing force of the plate spring 11 and the aforesaid force of resistance to which the film is subjected.

When the loop of film is reduced in size, the film is pivoted at the guide face 3a forming a shoulder and presses strongly against the friction wheel as shown by an extension C of the film loop B, so that the film presses strongly against the outer circumferential surface of the friction wheel 1. The force with which the film presses against the outer circumferential surface of the friction wheel 1 varies depending on the force of resistance mentioned above; the larger the force of resistance to which the film is subjected, the larger is the force which the film presses against the friction wheel. Accordingly, the frictional dragging of the friction wheel 1 exerted on the film is increased as the force with which the film presses against the friction wheel increases. Thus, the film is unwound from the supply reel and advanced in accordance with the force of resistance mentioned above, and the film loop gradually increases in size till the film is advanced in a stable manner. Since the peripheral speed of the friction wheel is selected at a higher level than the average rate of intermittent movement of the film given by the feed pawl, the film presses against the friction wheel so as to restore the film loop to a normal size as soon as the film loop is reduced in size. When the film loop becomes larger than normal in size, the film presses against the loop guide wall 2d. When the film is advanced in an amount larger than the amount of film advanced intermittently by the pawl 26, the film presses against the guide face 3b and remains out of contact with the friction wheel 1 as shown in FIG. 6, so that forward movement of an excess amount of film can be prevented. In actual practice, the film loop does not grow to such a degree that the friction wheel 1 is completely out of contact with the film as shown in FIG. 6. The film loop can be maintained in a stable condition by the force of resistance to which the film is subjected and (1) a film advance force control which causes a variation in the force with which the film presses against the friction wheel or (2) a film advance force control which brings the film out of contact with the friction wheel depending on the condition of the loop.

As can be clearly seen from the explanation of the embodiment set forth above, the auxiliary roller 8 is necessary for the film threading operation, but it performs almost no function when the projector is operated. However, the auxiliary roller 8 may be caused to automatically bear against the friction wheel 1 to increase the amount of film advanced when the film loop is greatly reduced in size in a normal projection operation. For example, the end can be attained if the lower film guide means 3 is pivotally supported by a shaft 23 and urged by a spring to move in the clockwise direction about the shaft 23 instead of being firmly fixed to the sidewall 14 by the screws 13, the lower film guide means 3 being caused to move in pivotal motion about the shaft 23 in the anticlockwise direction when the contact member 11a has moved to a position below the position shown by a broken line in FIG. 5, whereby the supporting plate is pushed in the anticlockwise direction by the lower end of the lower film guide means to cause the auxiliary roller 8 to press against the friction wheel 1 and forcibly advance the film.

FIG. 14 shows another embodiment of the present invention in which a member 111 corresponding to the plate spring 11 of the embodiment described above is inserted in an opening formed in lower film guide means 103 and pushed up by a spring 31.

Rollers 112 and 103a shown in FIG. 14 are used in place of the guide pin 12 and the guide face 3a of the lower film guide means 3 shown in FIG. 4 for the purpose of guiding the film more smoothly.

The operation of the second embodiment constructed as described above will now be explained.

1. There develops an increased force of resistance to the rotation of the supply reel from which the film is pulled out and to the unwinding of the film from the supply reel. When the film loop tends to become smaller in size, the film is caused by the resilience of the member and the aforesaid force of resistance to pivot the guide face 3a and press against the wheel with a greater force, whereby the frictional dragging of the friction wheel exerted on the film is increased and the feed of film is controlled such as to return the reducing film loop to a normal condition.

2. When the film loop tends to become larger in size, the film is automatically released from engagement with the friction wheel, whereby the feed of film is controlled such that the amount of film advanced is restricted.

3. As aforementioned, a film loop of normal condition and adequate amount of film can be maintained. Moreover, when a variation occurs in the film loop as a result of an error in intermittent feeding of the film by the feed pawl, the amount of film advanced can be adjusted to a suitable level as the film is caused by the guide face 3a to press against or move away from the friction wheel.

4. If the leading end of the film is inserted in the film insertion opening by forcibly causing the auxiliary roller to press against the friction wheel when the film is to be threaded in its path of movement, it is possible to automatically effect film threading. The operation can be facilitated if the auxiliary roller is operatively associated with a switch for operating the projector so that the auxiliary roller can be released from engagement with the friction wheel when the lamp is lit.

5. When a reduction in the size of film loop suddenly occurs and the reduction is in a great amount, it is possible to correct movement of the reel by automatically causing the auxiliary roller to press against the friction wheel to thereby forcibly advance the film.

From the foregoing description, it will appreciated that the present invention makes it possible to effect automatic threading of the film in a sprocketless movie projector and permits to effect film feed control more satisfactorily than in a movie projector provided with a sprocket.

The present invention as incorporated in the construction described hereinabove with reference to the embodiment permits to effect projection of pictures on the screen by feeding the film in a normal direction in a satisfactory manner. However, a slight difficulty is encountered when the direction of film feed is reversed or particularly when pictures are projected on the screen by feeding the film in a reverse direction. In another aspect, the invention provides an improvement in the construction described above. The improved construction will be explained with reference to a preferred embodiment.

If a movie projector is operated in a reverse direction while it is loaded with a film, the film feed pawl, friction wheel and film supply reel rotate in a reverse direction. If the supply reel is rotated at a higher rate than the friction wheel, the rate at which the film is wound on the supply reel is increased as the amount of film wound on the supply reel increases. Since the film is subjected to a winding action of the supply reel after it has passed by the feed pawl, the film is wound on the supply reel by moving along the shortest possible path as shown in FIG. 7. Therefore, the loop of film is reduced in size as much as the plate spring 11 permits. Moreover, a tensile force is at work in the film in this condition. It is thus impossible to project pictures on the screen in a stable manner.

It has been found that if the friction wheel 1 is caused to stop rotating or permitted to rotate idly so as to impart to the film passing by the friction wheel 1 a force which opposes the force with which the film is wound on the supply reel in order that a sufficiently large loop may be formed by a length of the film disposed in the loop guide portion, then it is possible to successfully effect projection of pictures on the screen by moving the film in a reverse direction.

An example of the construction which permits to attain the end is shown in FIGS. 10 to 12. The mechanism shown in FIG. 10 represents an improvement in the mechanism shown in FIG. 8. The drive wheel 19 is directly fixed to the shaft 21 in FIG. 8. In the mechanism shown in FIG. 10, however, a shaft 221 is formed with a portion 221a substantially rectangular in section over which is fitted pawl means 27 formed with a slot 27a and pawls 27b each having a sloped edge 27c on the rear side. A drive wheel 219 formed on one side with a suitable number of projections 219a is rotatably mounted on an end portion 221b of the shaft 221. If the projections 219a are arranged such that they are engaged by the pawls 27b, one of the projections 219a will be engaged by one of the pawls 27b of the pawl means 27 when the drive wheel 219 is rotated in the clockwise direction, whereby the rotation of the drive wheel 219 can be transmitted to the shaft 221. When the drive wheel 219 is rotated in the anticlockwise direction, one of the projections 219a is engaged by one of the gently sloped edges 27c, so that the pawl means 27 moves along the slot 27a as the rotation of the drive wheel 219 progresses, with the result that the rotation of the drive wheel 219 is not transmitted to the shaft 221. Therefore, the friction wheel 1 offers a resistance to the film when the film is moved in a reverse direction, permitting to attain the aforementioned object.

FIGS. 14 to 18 show another embodiment of this invention. In FIG. 16, a friction wheel 101 is firmly fixed to the outer end of a shaft 121 which is rotatably supported by bearing cylinder 122 firmly fixed to a sidewall 114. Firmly secured to the inner end of the shaft 121 is a pawl arm 68 which is positioned in a space formed in a pair of drive wheels 64 and 65 differing from each other in size. A ratchet pawl $69_I$ is pivotally mounted on a shaft $70_I$ which is connected to one end of the pawl arm 68, and another ratchet pawl $69_{II}$ is pivotally mounted on a shaft $70_{II}$ which is connected to the other end of the pawl arm 68, said ratchet pawls $69_I$ and $69_{II}$ being disposed in a circle and facing the same direction. A narrow spring 72 mounted between the forward ends of the pawls 69$_I$ and 69$_{II}$ normally urge the pawls to pivot at the shafts 70$_I$ and 70$_{II}$ respectively and more apart from each other.

The drive wheel 64 with the larger diameter is rotatably mounted on the inner projection of the bearing cylinder 122, and the drive wheel 65 of the smaller diameter is rotatably mounted on a shaft 66 firmly secured to an auxiliary plate 67. Said shaft 66 is arranged on an extension of the shaft 121 supporting the friction wheel. The pawl 69$_I$ is positioned in a recess in the larger diameter drive wheel 64 and cooperates with a serration 64a formed in the inner circumferential surface of the drive wheel 64. The smaller diameter drive wheel 65 is also formed on its inner circumferential surface with a similar serration 65a against which a projection 69$_{IIa}$ of the other pawl 69$_{II}$ presses.

A flanged annular member 71 is fitted in a boss 68a of the pawl arm 68 so as to prevent the dislodging of the drive wheel 64 from the bearing shaft 122.

In FIG. 16, a shaft 62 positioned below the drive wheels 64 and 65 is supported by a sidewall 114 and auxiliary plate 67 and rotatably mounts a gear 60 which is in meshing engagement with the drive wheel 65. A gear 61 which is in meshing engagement with the drive wheel 64 is firmly secured to the cylindrical portion of the gear 60 which is in meshing engagement with a worm 59 fixed to a shutter shaft 58 of the movie projector. The shutter shaft 58 is operated by the electric motor mounted in the projector in the same manner as conventional movie projectors.

If the shutter shaft 58 is rotated in a direction in which the film is moved in a normal direction, then the gear 60 is rotated by the worm 59, so that the gear 60 rotates the drive wheel 65 in the clockwise direction as seen from the friction wheel 101 (in the anticlockwise direction in FIG. 17). The gear 61 which rotates with the gear 60 as a unit also rotates the drive wheel 64 in the same direction as the drive wheel 65. Since the drive wheels 64 and 65 vary from each other in diameter, the smaller diameter drive wheel 65 rotates at a higher rate than the larger diameter drive wheel 64.

Upon rotation of the drive wheel 65 in the anticlockwise direction in FIG. 17, the projection 69$_{IIa}$ of the pawl 69$_{II}$ which is in engagement with the serration 65a formed on the inner circumferential surface of the drive wheel 65 is pushed, with the result that the shaft 121 is rotated in the same direction as the drive wheel 65. The peripheral speed of the drive wheel 65 is selected such that the peripheral speed of the friction wheel is slightly larger than the average rate of movement of the film intermittently advanced by the feed pawl.

Since the drive wheel 65 rotates at a higher rate than the drive wheel 64, the pawl 69$_I$ which cooperates with the drive wheel 64 rotates at a higher rate than the drive wheel 64, with the result that the pawl 69$_I$ merely slides on the serration 64a formed on the inner circumferential surface of the drive wheel 64 while it rotates. That is, when the movie projector is operated in a normal direction, no power is transmitted between the pawl 69$_I$ and the drive wheel 64.

If the movie projector is operated in a reverse direction or the shutter shaft 58 is rotated in a reverse direction so as to cause the film to move in a direction opposite to the direction in which the film is moved in a normal operation of the movie projector, the drive wheels 64 and 65 rotate in the anticlockwise direction as seen from the friction wheel 101. When the drive wheels 64 and 65 rotate in the anticlockwise direction (in the clockwise direction in FIGS. 17 and 18), no rotation is transmitted to the shaft 121 as can be seen from FIGS. 17 and 18. However, as the film is pulled backwardly by the rotation of the film supply reel in a reverse direction, the loop of film is reduced in size, so that the film is subjected to the biasing force of spring 31 of a resilient member 111 and tensioned thereby. Accordingly, the film presses against the friction wheel 101 by virtue of its natural resilience and causes the friction wheel to rotate in the direction of movement of the film.

When the rate of rotation of the friction wheel becomes equal to the rate of movement of the film, the pawl 69$_I$ engages the serration 64a of the drive wheel 64 which rotates at a lower rate than the friction wheel shaft 121 and tries to cause the same to rotate in the clockwise direction in FIG. 18. However, since the drive wheel 64 is rotated by the shutter shaft 58 at a constant rate, the drive wheel 64 is not caused to rotate by the pawl 69$_I$. After all, the rotation of the pawl 69$_I$ is restricted, so that the friction wheel rotates at the same rate as the drive wheel 64. If the peripheral speed of the friction wheel 101 is set at a slightly lower rate than the average rate of movement of the film advanced by a feed pawl 126, the force of the film pressing against the resilient member 111 is reduced and the force with which the film presses against the friction wheel 101 is reduced in the same manner as in the embodiment described previously when the amount of film advanced by the feed pawl per unit hour exceeds the amount of film advanced by the friction wheel per unit hour. Accordingly, the frictional dragging exerted by the friction wheel 101 on the film is reduced and slip tends to occur between them, so that an increase in the size of the loop of film can be prevented.

It is to be understood, of course, that the mechanism for coupling and uncoupling the drive wheels with friction wheel for the device for controlling the rotation of the friction wheel including the pair of drive wheels mounted at the inner end of the shaft 121 is not limited to the specific construction shown and described, and that any known means that can transmit rotation only in one direction may also be employed.

The reference numeral 102 designates upper guide means for forming a film loop, and the reference numeral 102a designates means which is formed with the film insertion opening in its front end. Other parts which was not explained in the description of this embodiment of the invention perform the same function as in the embodiment previously described.

Although the invention has been shown and described with preferred embodiments thereof, it is to be understood that the description thereof has been made only by way of example, and that the particular details herein set forth are capable of modification and variation without departing from the principles of the invention. It is further to be understood that the scope of the invention should be limited only be the scope and proper interpretation of the claims appended thereto.

We claim:

1. A device for use in movie projectors and movie cameras which comprises a film supply reel and a film gate wherein the device feeds movie film between the supply reel and the film gate without using a sprocket wheel for engaging the perforations in the film and feeding the film, wherein the improvement comprises a film feed friction wheel positioned between said supply reel and said film gate, film guide means positioned between said friction wheel and said gate and defining a space therebetween, said film guide means comprising a wall having an arcuate surface within said space for forming a loop of film as the film passes through said space between said friction wheel and film gate so that by means of the loop intermittent motion can be imparted to the film without resistance to such motion, wall means forming in combination with said friction wheel a film passage around a portion of the circumferential periphery of said friction wheel and said film passage opening at one end to said space and the other end arranged for receiving film unwound from said supply reel for guiding the film over a portion of the circumferential periphery of said friction wheel, a resilient member located within said space and spaced from said arcuate surface therein for contacting the film when the loop of film in said space is reduced in size and recedes from said arcuate surface and thereby tensioning the film in said film passage and pressing it against the circumferential periphery of said friction wheel and when the loop of film in said space is increased and contacts said arcuate surface the film in said film passage is released from engagement with the circumferential periphery of said friction wheel for maintaining the proper size of the loop within said space.

2. A device, as set forth in claim 1, wherein means are arranged for rotating said friction wheel at a peripheral speed slightly higher than the average rate of the intermittent movement of the film passing through said film gate for restoring the film loop to its normal size as soon as the film loop is reduced in size.

3. A device, as set forth in claim 2, wherein said means for rotating said friction wheel comprising a shaft secured to and extending axially from said friction wheel, a drive wheel rotatably mounted on said shaft at a position spaced from said friction wheel, and a clutch mounted on said shaft for rotating said shaft and said friction wheel when the film is passed from said film passage to said space and for disconnecting said drive wheel from said shaft when said drive wheel is rotated in the opposite direction.

4. A device, as set forth in claim 3, wherein said clutch comprising a pawl plate having an elongated slot formed therein, a section formed on said shaft and arranged to receive said pawl plate so that said pawl plate is movable on said section only in a direction normal to the axis of said shaft, a pair of pawl surfaces extending outwardly from the periphery of said pawl plate, said drive wheel mounted on said shaft adjacent said pawl plate, said drive wheel having projections thereon extending laterally from said drive wheel into the path of said pawl plate, whereby when said drive wheel rotates in the direction of normal feed of the film from said friction wheel to said film gate the projections on said drive wheel engage the pawl surfaces on said pawl plate causing said pawl plate and said shaft to rotate and when said drive wheel rotates in the opposite direction said projections ride on the periphery of said pawl plate without engaging said pawl surfaces and causing said pawl plate to be displaced normally to the axis of said shaft on said shaft so that the rotational movement of said drive wheel is not transmitted to said friction wheel.

5. A device, as set forth in claim 1, wherein said friction wheel has a pair of spaced surfaces each extending about one of the circumferential edges of said friction wheel and disposed radially outwardly from the surface of said wheel between said edge surfaces, and the outer surface of said edge surfaces being coated with a friction material.

6. A device, as set forth in claim 1, wherein a pressure roller having an axis disposed in parallel relationship with the axis of said friction wheel located at the entrance to said film passage around said friction wheel, said pressure roller pivotally mounted relative to the circumferential periphery of said friction wheel so said pressure roller can be selectively urged against said friction wheel and when the film loop in said space increases in size and contacts the arcuate surface therein the force of the film displaces said pressure roller away from said friction wheel.

7. A device, as set forth in claim 6, wherein said wall means forming the film passage comprising a rotatably mounted supporting plate, said pressure roller rotatably mounted on said supporting plate, and said supporting plate being arranged for varying the force for urging said pressure roller against said friction wheel.

8. A device, for use in movie projectors and movie cameras which comprises a film supply reel and a film gate wherein the device feeds movie film between the supply reel and the film gate without using a sprocket wheel for engaging perforations in the film for feeding the film, wherein the improvement comprises a film feed friction wheel positioned between said supply reel and said film gate, film guide means positioned between said friction wheel and film gate and defining a space therebetween, said film guide means comprising a wall having an arcuate surface within said space for forming a loop of film as the film passes through said space between said friction wheel and film gate so that intermittent motion can be imparted to the film without resistance to such motion, all means forming a film passage around a portion of the circumferential periphery of said friction wheel an opening at one end of the passage to said space and at the other end for receiving film unwound from said supply reel for guiding the film over a portion of the circumferential periphery of said friction wheel, a resilient member located within said space and spaced from said arcuate surface therein for contacting the film when the loop of film in said space is reduced in size and recedes from said arcuate surface, means for rotating said friction wheel in a direction for feeding film from said supply reel to said film gate so that the peripheral speed of said friction wheel is slightly higher than the average rate of intermittent movement of the film passing through said film gate, and means for regulating the rotation of said friction wheel for passing the film from said film gate to said supply reel so that the peripheral speed of said friction wheel is maintained slightly lower than average rate of intermittent movement of the film passing through said film gate toward said supply reel, whereby when the loop of film in said space is reduced in size and recedes away from said arcuate surface the film in said film passage presses against the circumferential periphery of said friction wheel and when the loop of film in said space is increased in contact said arcuate surface the film in said film passage is released from engagement with the circumferential periphery of said friction wheel.

9. A device, as set forth in claim 8, wherein a drive shaft securely fixed to and extending axially from said friction wheel, pawl means mounted on said shaft and spaced from said friction wheel, a first drive wheel and a second drive wheel mounted adjacent the end of said shaft and arranged to engage said pawl means when said first and second drive wheels are rotated, and means for rotating said first and second drive wheels, whereby when the film is to be fed in the normal direction from said supply reel to said film gate said first drive wheel drives said shaft through said pawl means, and when the direction of the film feed is reversed said second drive wheel through said pawl means acts as a brake on said shaft for regulating the rotational speed of said friction wheel so that it is slightly lower than the average rate of intermittent movement of the film passing through said film passage from said film gate to said supply reel.

10. A device, as set forth in claim 9, wherein said first drive wheel has a smaller diameter than said second drive wheel and said means for rotating said first and second drive wheels comprises shutter shaft means and gear means in meshed engagement with said shutter shaft means and said first and second drive wheels for driving said first and second drive wheels.